Feb. 12, 1963 P. WINCHELL 3,077,177
WARNING INDICATORS FOR INTERRUPTED POWER SUPPLY OF FREEZERS
Filed Sept. 23, 1960
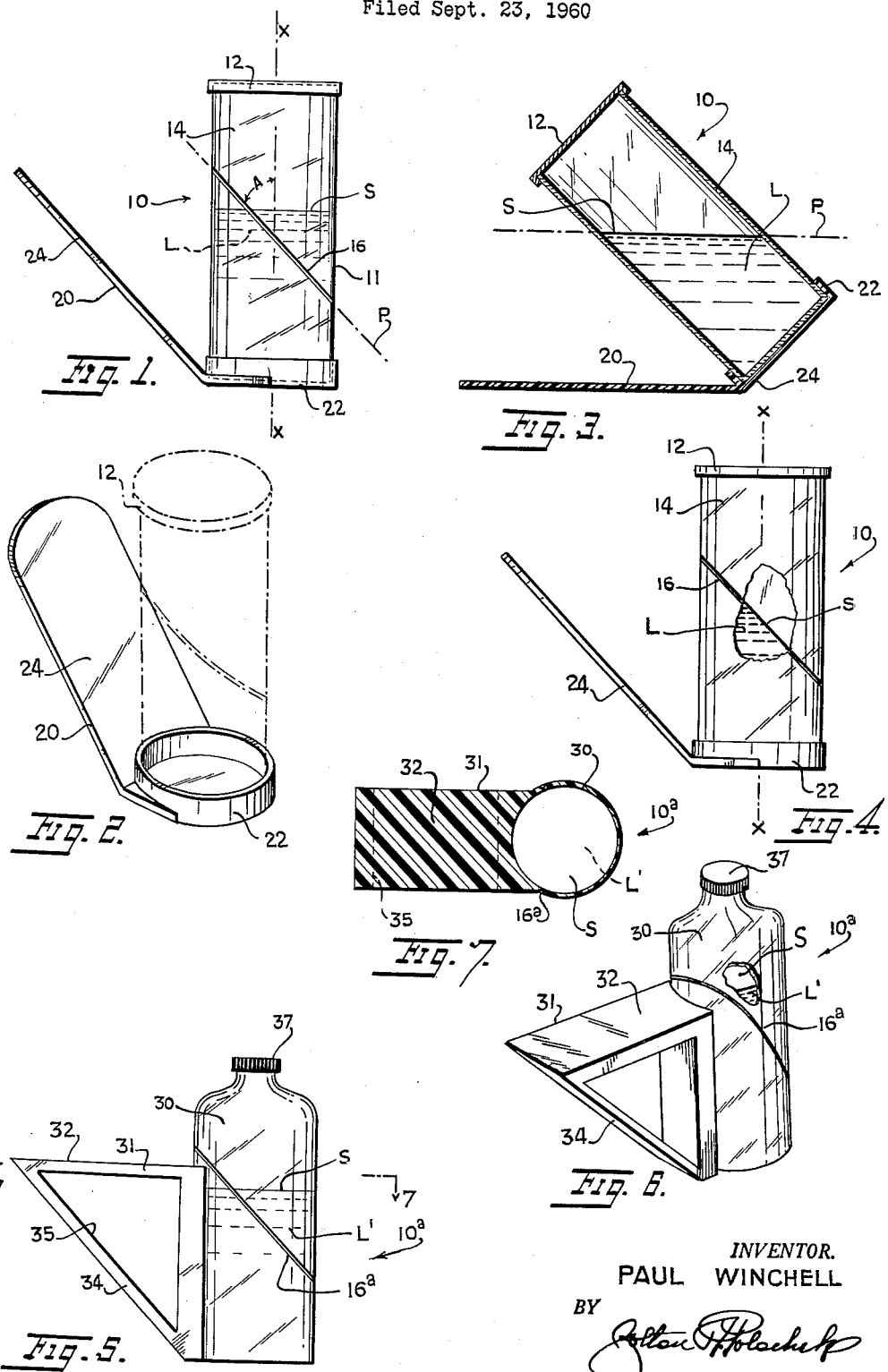
INVENTOR.
PAUL WINCHELL
BY
ATTORNEY United States Patent Office 3,077,177
Patented Feb. 12, 1963

3,077,177
WARNING INDICATORS FOR INTERRUPTED POWER SUPPLY OF FREEZERS
Paul Winchell, 9 Althea Lane, Larchmont, N.Y.
Filed Sept. 23, 1960, Ser. No. 58,099
5 Claims. (Cl. 116—114)

This invention concerns an indicating device which will show whether the power supply of a freezer refrigeration system has been interrupted for a sufficiently long period of time to permit food, drugs or other products in the freezer to thaw out.

The spoilage of certain products such as quick frozen food and of certain medicine, is generally more rapid than spoilage of fresh food. It is necessary that the user be reliably informed if the packaged food or certain other products have been exposed to conditions of elevated temperature which would likely cause spoilage. It is necessary that the user be informed of the interruption of freezing refrigeration even though the freezing condition is subsequently restored and the food has become refrozen, due to restoration of the interrupted power supply to the refrigeration apparatus.

Various telltale devices have been proposed for incorporation in frozen food, drugs and the like packages, but none is suitable for use by itself in a freezer or the freezer compartment of a refrigerator.

It is one object of the invention to provide a device which will serve as an indicator or warning that the refrigeration of a freezer has been interrupted.

It is another object to provide a reuseable device which may be disposed in a freezer or on a freezer compartment of a refrigerator to indicate whether or not the food or some other products therein have been thawed and refrozen while in the freezer.

A further object of the invention is to provide a transparent container of freezable liquid having means for supporting the container at an angle to a normal axially vertical position, so that the upper surface of the frozen liquid may be disposed in a plane at an angle to the axis of the container, the upper surface of the liquid assuming a horizontal position perpendicular to the axis if the liquid is once thawed.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of one form of the invention.

FIG. 2 is a perspective view of a stand useful in the invention with a dotted outline of the container.

FIG. 3 is a vertical cross sectional view of the device at one position during a freezing step.

FIG. 4 is a side elevational view of the device similar to FIG. 1, with a portion broken away to show the frozen liquid inside.

FIG. 5 is a side elevational view of another device embodying the invention.

FIG. 6 is a perspective view of the device of FIG. 5.

FIG. 7 is a cross sectional view of the device on line 7—7 of FIG. 5.

Referring to FIGS. 1-4, there is shown a device 10 including a cylindrical container such as a jar or bottle 11 provided with a cap 12 at its open top. The container has a transparent body formed of glass, plastic or the like. On the transparent cylindrical wall 14 of the container is etched an elliptical line 16 disposed in a plane P at an acute angle A such as 45° to the axis X—X of the container; see FIG. 1. The container is partially filled with water or other liquid L which will freeze and thaw at approximately the same temperature as food stored in the freezer in which the device is to be used.

A stand 20 is provided with a shallow cylindrical base 22 to receive the container in a snug friction fit. The stand has a side wall 24 which extends at an angle to the base 22 parallel to plane P and line 16. The liquid L may be colored by a dye to increase its visibility in the container.

FIG. 1 shows the upper surface S of the liquid is horizontal when the container is axially vertical and supported in stand 20 on base 22. If the stand is tilted to the position of FIG. 3, the surface S will again assume a horizontal position parallel to line 16 and coplanar with plane P. The device will initially be inserted into a freezer or freezer compartment of a refrigerator in the position of FIG. 3 so that the liquid L freezes solid with its upper surface S in plane P. After freezing the device will be repositioned in the freezer unit so that the container is axially vertical as shown in FIG. 4. Surface S remains parallel to plane P and wall 24. If the temperature of the freezer should rise above the melting point of the liquid for a sufficient length of time to melt the frozen liquid, then the liquid's surface S will become horizontal as indicated in FIG. 1. If thereafter the temperature of the freezer is lowered, the liquid will refreeze with its upper surface S horizontal. This will indicate that the liquid was previously warmed and will serve as a warning to the user that the food, drugs, or other critical, sensitive products in the freezer has been subjected to elevation in temperature and subsequent refreezing so that it may be in rancid or otherwise unsafe condition.

In the form of the invention shown in FIGS. 5-7, device 10ᵃ includes bottle 30 integral with a laterally extending triangular projection 31. This projection includes an upper plate 32. Integral with the plate 32 and the bottom of the container is a flat wall 34 extending at acute angles to the central axis of the bottle and to the plate 32. The flat wall 34 may serve as a base to support the bottle while liquid L' therein is being frozen in the same manner as described for the device 10.

An elliptical groove 16ᵃ is etched in the side wall 33 of the container parallel to wall 34. An opening 35 is provided in the triangular projection so that it may serve as a handle. The bottle has a removable cap 37. The containers 11 and 30 are made of transparent synthetic resin plastic material such as acrylic, cellulose acetate, and the like.

If desired, the caps 12 and 37 may be permanently and non-removably secured to the tops of the containers. The device can be reused as often as desired by refreezing liquid L or L' in a position coplanar with line 16 or 16ᵃ.

While I have illustrated and described the preferred embodiments of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A device for indicating that a freezer has thawed, comprising a container partially filled with a freezable liquid, said container having a transparent cylindrical body, and means for supporting the container in the freezer with its axis disposed at an acute angle to a vertical plane so that the liquid in a frozen state has its upper surface angularly disposed at said angle to the axis of the container, said body having an elliptical marking thereon disposed in a plane at an acute angle to the axis of the container.

2. A device for indicating that a freezer has thawed, comprising a container partially filled with a freezable liquid, said container having a transparent cylindrical body, and a support for supporting the container in the freezer with the central axis of the container at an angle to a vertical plane so that the liquid in a frozen state has its upper surface disposed at said angle to the axis of the container, said support being constituted by a triangular projection integral with said body, said projection having a wall disposed at said angle to the axis of the container.

3. A device for indicating that a freezer has thawed, comprising a container partially filled with a freezable liquid, said container having a transparent cylindrical body, and a support for supporting the container in the freezer with the central axis of the container at an angle to a vertical plane so that the liquid in a frozen state has its upper surface disposed at said angle to the axis of the container, said container being removably disposed in said support, said support including a shallow cylindrical base receiving the container in a snug friction fit, said support having a wall extending outwardly from the container at said angle to the axis thereof, said body having an elliptical line thereon disposed in a plane at said angle to the axis of the container.

4. A device for indicating that a freezer has thawed, comprising a container partially filled with a freezable liquid, said container having a transparent cylindrical body, and a support for supporting the container in the freezer with the central axis of the container at an angle to a vertical plane so that the liquid in a frozen state has its upper surface disposed at said angle to the axis of the container, said support constituted by a triangular projection integral with said body, said projection having a wall disposed at said angle to the axis of the container, and a plate connecting the container and said wall, said projection having an opening serving as handle means, said body having an elliptical line thereon disposed in a plane at said angle to the axis of the container.

5. A device for indicating that a freezer has thawed comprising in combination an elongated cylindrical transparent container sealed at both ends, a quantity of freezable liquid in the container only partly filling the interior thereof, and a support mounted on one end of the container for supporting the container, said support having a circular base with an outwardly extending peripheral flange therearound, and a thin narrow wall extending outwardly from the periphery of the base at an acute angle to the plane of the base, said base adapted to receive one end of the container for supporting the container in a truly vertical position, said base and wall adapted to serve as a combined support for supporting the container, with the liquid therein, in a position at an acute angle to the axis of the container so that the liquid therein has a level at an acute angle to the axis of the container and becomes a fixed angle upon freezing and thereafter when the container is supported in a truly vertical condition, the frozen liquid upon thawing assumes a level at right angles to the axis of the container providing a telltale that the frozen liquid has thawed.

References Cited in the file of this patent
UNITED STATES PATENTS

| | | |
|---|---|---|
| 2,847,067 | Brewer | Aug. 12, 1958 |
| 2,856,885 | Huyck et al. | Oct. 21, 1958 |

FOREIGN PATENTS

| | | |
|---|---|---|
| 238,394 | Germany | Oct. 27, 1910 |
| 831,367 | Germany | Mar. 30, 1960 |